3,113,947
METHOD OF MAKING AMINO NITROTHIAZOLE
Robert B. Currie, Roselle, N.J., assignor to Merck & Co., Inc., Rahway, N.J., a corporation of New Jersey
No Drawing. Filed Mar. 24, 1959, Ser. No. 801,445
1 Claim. (Cl. 260—306.8)

This invention relates to an improved method of preparing 2-amino-5-nitrothiazole. More particularly it is concerned with a method for synthesizing 2-amino-5-nitrothiazole from 2-aminothiazole. Still more specifically it relates to a process whereby 2-amino-5-nitrothiazole is obtained from 2-aminothiazole in high yields and in good quality.

2-amino-5-nitrothiazole (sometimes referred to herein as amino nitrothiazole) is a known compound which is useful in the treatment of entero-hepatitis in turkeys, and which is also useful as an intermediate in making other substituted thiazoles active in the treatment of poultry diseases. Heretofore, amino nitrothiazole has been prepared by the treatment of 2-aminothiazole with a sulfuric acid-nitric acid nitrating mixture. This process is not entirely satisfactory since the reaction may become violently exothermic and since the quality and yields of the amino nitrothiazole thus produced are not as high as could be desired.

According to the present invention, a method of converting 2-aminothiazole to 2-amino-5-nitrothiazole free of the risks and disadvantages of the prior art methods has been discovered. My new method comprises the initial formation and isolation of the nitrate salt of 2-aminothiazole, and rearrangement of such salt to the desired 2-amino-5-nitrothiazole.

In the first phase of this process a mixture of 2-aminothiazole in water is treated with concentrated nitric acid. Sufficient acid is employed to bring the pH of the reaction medium to about 1.0. The initial mixing of the concentrated acid with aqueous mixture is exothermic and sufficient heat is normally generated (in the absence of external cooling) to raise the temperature of the medium from about 25° C. to about 50–60° C. According to a preferred embodiment of the invention, this solution is heated further to about 80–90° C. for a short period of time. If desired, the aqueous solution of 2-aminothiazole nitrate may be filtered to remove insoluble impurities or treated with decolorizing charcoal. The desired salt is insoluble in cold water and is crystallized by cooling the reaction medium to about 10–20° C. It is recovered by standard techniques such as filtration or centrifugation.

The nitrate salt of 2-aminothiazole thus obtained may be dried, if desired, before the next step of the process. A small amount of water, however, is not detrimental to the succeeding rearrangement step and in the preferred embodiment of the invention the nitrate salt is dried to a moisture content of less than 10% and then employed directly in the following reaction. If convenient, the filtrate obtained after removal of crystallized 2-aminothiazole nitrate from the reaction medium may be utilized as the reaction solvent for the preparation of further quantities of nitrate salt.

The second and critical step of my new process comprises formation of 2-amino-5-nitrothiazole by the treatment of 2-aminothiazole nitrate with concentrated sulfuric acid at an elevated temperature. Under the reaction conditions described below the nitrate salt is rearranged to amino nitrothiazole in high yield.

In carrying out this rearrangement step the nitrate salt is added to concentrated sulfuric acid at a temperature in the range of 0–30° C. Addition temperatures higher than 30° C. are not preferred since the yield of end product suffers thereby although it should be pointed out that significant amounts of amino nitrothiazole are obtained at addition temperatures up to about 60° C.

After the mixing of 2-aminothiazole nitrate and the sulfuric acid is complete, the temperature of the reaction medium is raised to about 50–95° C., and preferably to about 85–95° C. It will be realized that the time of heating required for optimum results will depend on the particular temperature employed. In the preferred embodiment of the process the temperature is raised gradually to about 85–95° C. and maintained at that point for from 15 to 45 minutes.

At the end of the reaction period the rearrangement mixture is quenched in the cold and 2-amino-5-nitrothiazole recovered therefrom by neutralization of the highly acidic solution with base to a pH of about 3.0–4.0. The neutralization is conveniently carried out with an alkali metal hydroxide such as potassium or sodium hydroxide or with ammonium hydroxide.

In this rearrangement step leading to formation of 2-amino-5-nitrothiazole, at least about 2.5 grams of 98% sulfuric acid are employed per gram of 2-aminothiazole nitrate. Larger amounts may, of course, be employed as desired and optimum results are obtained when about 3.25–3.5 grams of concentrated sulfuric acid per gram of nitrate salt are utilized.

The 2-amino-5-nitrothiazole obtained in accordance with the new process above described is a bright yellow solid at least 98% pure.

The following examples are given for purposes of illustration and not by way of limitation:

Example 1

One hundred grams of 2-aminothiazole is slurried in 200 ml. of water. The pH of the mixture is adjusted to 1.0±0.2 with concentrated nitric acid. About 66 ml. of acid are required. The temperature of the reaction medium rises to about 60° C. and is further heated to about 80° C. The solution is treated with three grams of decolorizing charcoal and filtered hot. The filtrate is cooled to about 20° C. and aged at this temperature for two hours. The solid 2-aminothiazole nitrate thus obtained is recovered by centrifugation and the centirfuged cake is spray-washed with ice-cold water until substantially free of chloride. About 20 ml. of wash water are required. The centrifuge cake is then spun until it appears dry. The 2-aminothiazole nitrate thus obtained is found to contain about 5% water. 134.5 grams of product (on a dry basis) are obtained, melting point 152–157° C.

When the above experiment is repeated employing the filtrate above obtained as the reaction medium, about 153 grams of dry 2-aminothiazole nitrate are recovered.

Example 2

40.8 grams of 2-aminothiazole nitrate is added in portions to 74 ml. of 98% sulfuric acid at 15° C. The addition requires about one hour. The reaction mixture is then heated at a uniform rate to 90° C. over one hour and is then held at 90° C. for 30 minutes. The solution is then cooled to 25° C. and poured onto 250 grams of ice, the temperature being maintained below 15° C. The resulting solution is filtered and 2-amino-5-nitrothiazole precipitated from the filtrate by addition to the filtrate of 10% aqueous ammonium hydroxide. This addition is carried out at about 15° C. with vigorous agitation. The pH is brought to 3.5, about 490 ml. of base being required for this.

The solid 2-amino-5-nitrothiazole thus obtained is centrifuged, washed with water and spun dry. 33.9 grams (on a dry basis) are obtained, melting point 199–202° C.

What is claimed is:

The process for preparing 2-amino-5-nitrothiazole that comprises heating a reaction mixture consisting of the nitrate salt of 2-aminothiazole containing less than 10% water and concentrated sulfuric acid at a temperature of from about 50° C. up to about 95° C., the only source of the nitro group in the reaction mixture being said nitrate salt.

References Cited in the file of this patent

UNITED STATES PATENTS 2,617,809    Hubbard et al. _____ Nov. 11, 1952

OTHER REFERENCES

Ganapathia et al.: Chem. Abstracts, volume 40, column 4058 (1946).

Elderfield: "Heterocyclic Compounds," volume 5, page 634 (1957).